United States Patent
Yamakawa

(10) Patent No.: US 9,344,709 B2
(45) Date of Patent: May 17, 2016

(54) DISPLAY CONTROL CIRCUIT, LIQUID CRYSTAL DISPLAY DEVICE INCLUDING THE SAME, AND DISPLAY CONTROL METHOD

(71) Applicant: Sharp Kabushiki Kaisha, Osaka-shi, Osaka (JP)

(72) Inventor: Ryo Yamakawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 284 days.

(21) Appl. No.: 14/350,419

(22) PCT Filed: Oct. 11, 2012

(86) PCT No.: PCT/JP2012/076280
§ 371 (c)(1),
(2) Date: Apr. 8, 2014

(87) PCT Pub. No.: WO2014/176908
PCT Pub. Date: Nov. 6, 2014

(65) Prior Publication Data
US 2014/0267463 A1    Sep. 18, 2014

(30) Foreign Application Priority Data

Oct. 18, 2011    (JP) ................................. 2011-228701

(51) Int. Cl.
G09G 3/36     (2006.01)
H04N 13/04    (2006.01)
G09G 3/00     (2006.01)

(52) U.S. Cl.
CPC ........... *H04N 13/0422* (2013.01); *G09G 3/003* (2013.01); *G09G 3/3607* (2013.01);
(Continued)

(58) Field of Classification Search
None
See application file for complete search history.

(56) References Cited

U.S. PATENT DOCUMENTS

2005/0190610 A1*  9/2005  Furukawa ............ G09G 3/2055
                                              365/189.05
2008/0316303 A1* 12/2008  Chiu ..................... G09G 3/003
                                                  348/51

(Continued)

FOREIGN PATENT DOCUMENTS

JP          2005-242026 A     9/2005

OTHER PUBLICATIONS

Official Communication issued in International Patent Application No. PCT/JP2012/076280, mailed on Dec. 18, 2012.

*Primary Examiner* — Kent Chang
*Assistant Examiner* — Benjamin Morales Fernande
(74) *Attorney, Agent, or Firm* — Keating & Bennett, LLP

(57) ABSTRACT

An object of the present invention is to suppress a reduction in image quality caused by crosstalk in a liquid crystal display device capable of performing 3D display. A predetermined number of pixels (e.g., pixels of two rows×two columns) having the same gray scale value are divided into pixels (first pixel group) whose post-correction gray scale values are the same between a left-eye image and a right-eye image, and pixels (second pixel group) whose post-correction gray scale values are different between the left-eye image and the right-eye image. For example, an average value between a pre-correction gray scale value of the left-eye image and a pre-correction gray scale value of the right-eye image is a post-correction gray scale value of the first pixel group. The post-correction gray scale values of the second pixel group are determined such that, for both of the left-eye image and the right-eye image, an average gray scale value of each group including the predetermined number of pixels is not changed between before and after the correction.

6 Claims, 11 Drawing Sheets

(52) U.S. Cl.
CPC ...... *G09G3/3648* (2013.01); *G09G 2320/0209* (2013.01); *G09G 2320/0214* (2013.01); *G09G 2320/0252* (2013.01); *G09G 2320/0271* (2013.01); *G09G 2340/16* (2013.01)

(56) References Cited

U.S. PATENT DOCUMENTS

| | | | |
|---|---|---|---|
| 2011/0001806 A1* | 1/2011 | Nakahata | H04N 13/0422 348/56 |
| 2011/0037829 A1* | 2/2011 | Hata | H04N 13/0025 348/43 |
| 2011/0090321 A1* | 4/2011 | Nakagawa | G09G 3/003 348/51 |
| 2011/0157161 A1* | 6/2011 | Choi | G09G 3/003 345/419 |
| 2011/0210964 A1* | 9/2011 | Chiu | G09G 3/001 345/419 |
| 2011/0310090 A1* | 12/2011 | Kim | G02B 27/2264 345/419 |
| 2011/0316849 A1* | 12/2011 | Shindo | H04N 13/0025 345/419 |
| 2012/0007858 A1* | 1/2012 | Baek | G02B 27/26 345/419 |
| 2012/0007895 A1* | 1/2012 | Kim | H04N 13/0025 345/690 |
| 2012/0147161 A1* | 6/2012 | Kim | H04N 13/0422 348/58 |
| 2013/0128019 A1* | 5/2013 | Tajima | G02B 27/2214 348/59 |

* cited by examiner

Fig.4

| | 0 | ... | 32 | ... | 64 | ... | 96 | ... | 128 | ... | 160 | ... | 192 | ... | 224 | ... | 255 |
|---|---|---|---|---|---|---|---|---|---|---|---|---|---|---|---|---|---|
| 0 | 0 | ... | 32 | ... | 64 | ... | 96 | ... | 128 | ... | 160 | ... | 192 | ... | 224 | ... | 255 |
| ... | ... | ... | ... | ... | ... | ... | ... | ... | ... | ... | ... | ... | ... | ... | ... | ... | ... |
| 32 | 0 | ... | 0 | ... | 6 | ... | 18 | ... | 56 | ... | 116 | ... | 170 | ... | 219 | ... | 255 |
| ... | ... | ... | ... | ... | ... | ... | ... | ... | ... | ... | ... | ... | ... | ... | ... | ... | ... |
| 64 | 0 | ... | 0 | ... | 10 | ... | 28 | ... | 79 | ... | 137 | ... | 184 | ... | 224 | ... | 255 |
| ... | ... | ... | ... | ... | ... | ... | ... | ... | ... | ... | ... | ... | ... | ... | ... | ... | ... |
| 96 | 0 | ... | 2 | ... | 14 | ... | 44 | ... | 100 | ... | 150 | ... | 192 | ... | 228 | ... | 255 |
| ... | ... | ... | ... | ... | ... | ... | ... | ... | ... | ... | ... | ... | ... | ... | ... | ... | ... |
| 128 | 0 | ... | 4 | ... | 20 | ... | 60 | ... | 114 | ... | 160 | ... | 198 | ... | 231 | ... | 255 |
| ... | ... | ... | ... | ... | ... | ... | ... | ... | ... | ... | ... | ... | ... | ... | ... | ... | ... |
| 160 | 0 | ... | 6 | ... | 27 | ... | 78 | ... | 128 | ... | 170 | ... | 204 | ... | 234 | ... | 255 |
| ... | ... | ... | ... | ... | ... | ... | ... | ... | ... | ... | ... | ... | ... | ... | ... | ... | ... |
| 192 | 0 | ... | 9 | ... | 43 | ... | 96 | ... | 141 | ... | 179 | ... | 209 | ... | 236 | ... | 255 |
| ... | ... | ... | ... | ... | ... | ... | ... | ... | ... | ... | ... | ... | ... | ... | ... | ... | ... |
| 224 | 0 | ... | 14 | ... | 64 | ... | 116 | ... | 155 | ... | 189 | ... | 214 | ... | 238 | ... | 255 |
| ... | ... | ... | ... | ... | ... | ... | ... | ... | ... | ... | ... | ... | ... | ... | ... | ... | ... |
| 255 | 0 | ... | 32 | ... | 104 | ... | 145 | ... | 176 | ... | 201 | ... | 221 | ... | 240 | ... | 255 |
| ... | ... | ... | ... | ... | ... | ... | ... | ... | ... | ... | ... | ... | ... | ... | ... | ... | ... |
| | 0 | ... | 112 | ... | 172 | ... | 198 | ... | 213 | ... | 225 | ... | 235 | ... | 246 | ... | 255 |
| | 0 | ... | 32 | ... | 64 | ... | 96 | ... | 128 | ... | 160 | ... | 192 | ... | 224 | ... | 255 |

CURRENT-FRAME GRAY SCALE VALUE (columns)
PREVIOUS-FRAME GRAY SCALE VALUE (rows)

Pix(1,1)  Pix(2,1)

Pix(1,2)  Pix(2,2)

FOR LEFT EYE

| 12 | 12 |
|----|----|
| 12 | 12 |

FOR RIGHT EYE

| 16 | 16 |
|----|----|
| 16 | 16 |

FOR LEFT EYE

| 10 | 14 |
|----|----|
| 14 | 10 |

FOR RIGHT EYE

| 18 | 14 |
|----|----|
| 14 | 18 |

| 10 | 15 |
|----|----|
| 10 | 15 |

Fig.9

CURRENT-FRAME GRAY SCALE VALUE

| | 0 | 32 | 64 | 96 | 128 | 160 | 192 | 224 | 255 |
|---|---|---|---|---|---|---|---|---|---|
| 0 | | 2.4 | 2.4 | 3.0 | 2.1 | 2.3 | 2.7 | 2.7 | 3.1 |
| 32 | 4.0 | | 7.4 | 3.6 | 3.7 | 3.8 | 3.9 | 3.6 | 4.6 |
| 64 | 4.2 | 3.8 | | 6.4 | 4.1 | 4.2 | 4.0 | 3.7 | 3.2 |
| 96 | 4.0 | 3.8 | 4.6 | | 5.5 | 4.2 | 3.7 | 3.0 | 2.0 |
| 128 | 4.0 | 3.2 | 3.9 | 5.4 | | 5.3 | 3.7 | 2.9 | 1.9 |
| 160 | 4.1 | 3.3 | 3.9 | 3.9 | 4.7 | | 4.5 | 3.1 | 2.1 |
| 192 | 4.1 | 3.5 | 3.7 | 3.7 | 3.7 | 4.4 | | 2.7 | 4.9 |
| 224 | 4.3 | 3.7 | 3.5 | 3.8 | 3.6 | 4.0 | 3.4 | | 4.0 |
| 255 | 4.1 | 4.2 | 3.6 | 3.7 | 3.8 | 3.8 | 3.6 | 3.1 | |

PREVIOUS-FRAME GRAY SCALE VALUE

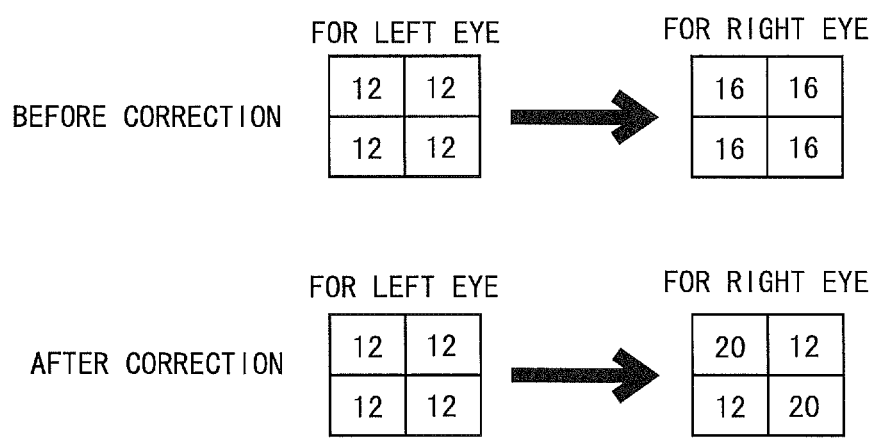

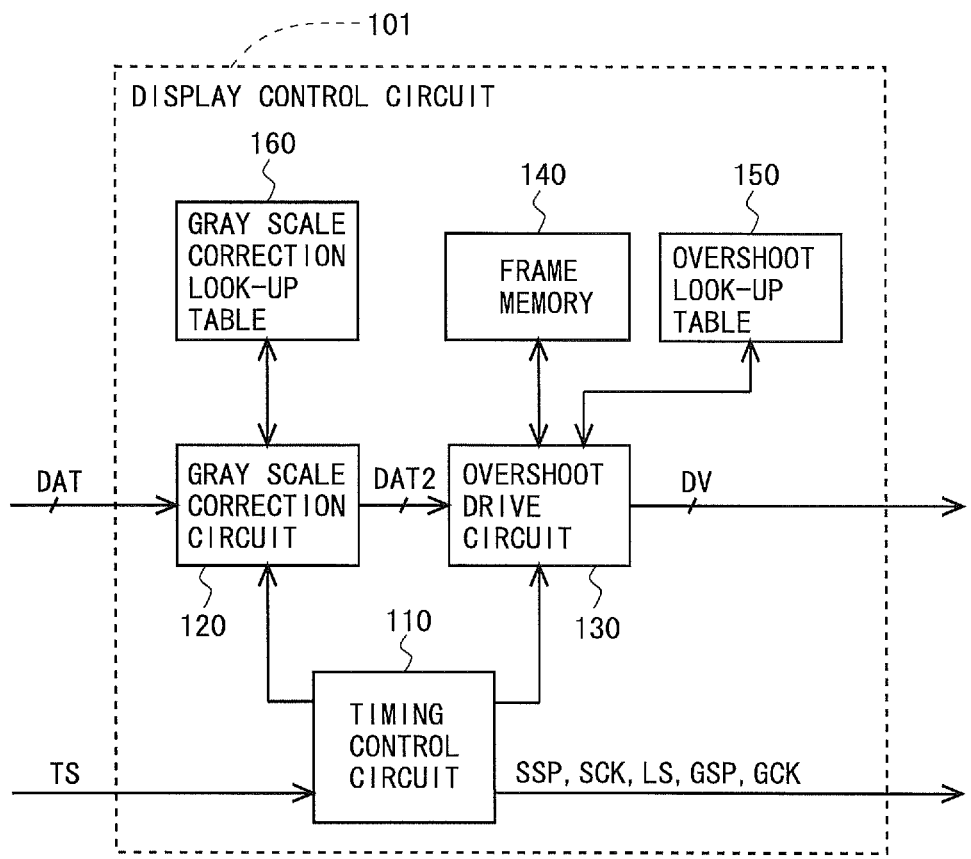

DISPLAY CONTROL CIRCUIT, LIQUID CRYSTAL DISPLAY DEVICE INCLUDING THE SAME, AND DISPLAY CONTROL METHOD

TECHNICAL FIELD

The present invention relates to a display control circuit and more particularly to a display control circuit provided in a liquid crystal display device capable of performing 3D display.

BACKGROUND ART

In recent years, many liquid crystal display devices capable of performing 3D display (stereoscopic vision) such as 3D television devices have been on the market. In a liquid crystal display device adopting a frame-sequential method which is one of the methods for achieving 3D display, a left-eye image and a right-eye image are alternately displayed on a liquid crystal panel every predetermined period of time (e.g., every $\frac{1}{120}$ second) and the lenses of active shutter glasses alternately open and close one at a time in synchronization with the display. In this manner, an image with parallax between left and right eyes is visually recognized, and accordingly, a viewer perceives the image as a stereo image.

As for liquid crystal display devices capable of performing 3D display, a reduction in crosstalk is a conventional issue. Crosstalk is a phenomenon where a left-eye image is also captured by a viewer's right eye and a right-eye image is also captured by a viewer's left eye, and accordingly, an image where the left-eye image and the right-eye image overlap each other is visually recognized.

Now, the occurrence of crosstalk will be described with reference to FIGS. 19 and 20. FIG. 19 is a diagram showing an ideal change in luminance for when 3D display is performed. FIG. 20 is a diagram showing an actual change in luminance for when 3D display is performed. Note that in FIGS. 19 and 20, the horizontal axis represents time, and the vertical axis represents luminance. Note also that reference character TL indicates a left-eye image display period, and reference character TR indicates a right-eye image display period. When a frame-sequential method is adopted, liquid crystal molecules are driven such that, as described above, a left-eye image and a right-eye image are alternately displayed. If the target luminance of the left-eye image in a certain region is Lu(R) and the target luminance of the right-eye image in the region is Lu(L), then ideally the luminance should change as shown in FIG. 19. If the luminance changes as shown in FIG. 19, crosstalk does not occur. However, since liquid crystal responsiveness is not good, in practice the luminance changes as shown in FIG. 20. Specifically, at switching timing between left-eye image display and right-eye image display, the luminance changes in a delayed manner compared to the ideal change. In FIG. 20, a hatched portion indicated by reference character 90 indicates a period during which the target luminance is not reached due to a delay in change in luminance. Due to the difference between the actual luminance and the target luminance during this period, crosstalk occurs.

For measures to suppress a reduction in image quality caused by crosstalk such as that described above, an improvement in the drive frequency of a liquid crystal panel, an improvement in the control of light emission of an LED backlight, an improvement in liquid crystal response speed, etc., are conventionally performed.

Note that in connection with this invention, Japanese Patent Application Laid-Open No. 2005-242026 describes implementation of a high image quality liquid crystal display that is provided with high-speed responsiveness and high gray scale representation capability by combining overshoot drive that forcefully allows liquid crystal to respond at high speed, and a pseudo-multi-gray-scale technique for increasing the number of display gray scales by applying noise. Detailed description of the overshoot drive will be provided later.

PRIOR ART DOCUMENT

Patent Document

[Patent Document 1] Japanese Patent Application Laid-Open No. 2005-242026

SUMMARY OF THE INVENTION

Problems to be Solved by the Invention

Although, as described above, liquid crystal response speed is improved, liquid crystal does not yet sufficiently respond at switching timing between left-eye image display and right-eye image display, and thus, a reduction in image quality caused by crosstalk has not been sufficiently overcome.

An object of the present invention is therefore to suppress a reduction in image quality caused by crosstalk in a liquid crystal display device capable of performing 3D display.

Means for Solving the Problems

A first aspect of the present invention is directed to a display control circuit that generates write gray scale data to be provided to a display device, based on an image signal including left-eye gray scale data and right-eye gray scale data, the display device displaying a 3D image by alternately displaying a left-eye image and a right-eye image, the display control circuit comprising:

a gray scale correction circuit that corrects the image signal such that an average gray scale value of each of groups is not changed between before and after the correction, each group including a predetermined number of pixels adjacent to each other, and the pixels having a same gray scale value indicated by the left-eye gray scale data and having a same gray scale value indicated by the right-eye gray scale data; and an overshoot drive circuit that generates the write gray scale data by performing correction on the image signal corrected by the gray scale correction circuit, to emphasize a temporal change of the signal, wherein the gray scale correction circuit divides the predetermined number of pixels included in each group into a first pixel group and a second pixel group, and corrects the image signal such that a post-correction gray scale value for the left-eye gray scale data and a post-correction gray scale value for the right-eye gray scale data are equal to each other for at least the first pixel group.

According to a second aspect of the present invention, in the first aspect of the present invention, a post-correction gray scale value GM for the left-eye gray scale data and the right-eye gray scale data for the first pixel group is calculated by a following equation:

$$GM = (GL + GR)/2$$

where GL represents a pre-correction gray scale value for the left-eye gray scale data, and GR represents a pre-correction gray scale value for the right-eye gray scale data.

According to a third aspect of the present invention, in the first aspect of the present invention, the gray scale correction circuit corrects, for the second pixel group, the image signal such that a gray scale value for the left-eye gray scale data or a gray scale value for the right-eye gray scale data is not changed between before and after the correction.

According to a fourth aspect of the present invention, in the first aspect of the present invention, the display control circuit further comprises a gray scale correction look-up table that stores a first input value, a second input value, and an output value corresponding to a combination of the first input value and the second input value, wherein with a pre-correction gray scale value for the left-eye gray scale data being the first input value and a pre-correction gray scale value for the right-eye gray scale data being the second input value, the gray scale correction circuit extracts an output value from the gray scale correction look-up table, and uses the extracted output value as a post-correction gray scale value for the left-eye gray scale data and the right-eye gray scale data for the first pixel group.

A fifth aspect of the present invention is directed to a liquid crystal display device comprising:

the display control circuit according to the first aspect of the present invention;

a display unit including: a plurality of video signal lines for transmitting a plurality of video signals corresponding to the write gray scale data; a plurality of scanning signal lines intersecting the plurality of video signal lines; a plurality of pixel formation portions arranged in a matrix along the plurality of video signal lines and the plurality of scanning signal lines; and a common electrode that provides a common potential to the plurality of pixel formation portions;

a video signal line drive circuit that drives the plurality of video signal lines; and a scanning signal line drive circuit that drives the plurality of scanning signal lines.

A sixth aspect of the present invention is directed to a display control method for generating write gray scale data to be provided to a display device, based on an image signal including left-eye gray scale data and right-eye gray scale data, the display device displaying a 3D image by alternately displaying a left-eye image and a right-eye image, the method comprising:

a gray scale correction step of correcting the image signal such that an average gray scale value of each of groups is not changed between before and after the correction, each group including a predetermined number of pixels adjacent to each other, and the pixels having a same gray scale value indicated by the left-eye gray scale data and having a same gray scale value indicated by the right-eye gray scale data; and an overshoot drive step of generating the write gray scale data by performing correction on the image signal corrected in the gray scale correction step, to emphasize a temporal change of the signal, wherein in the gray scale correction step, the predetermined number of pixels included in each group are divided into a first pixel group and a second pixel group, and the image signal is corrected such that a post-correction gray scale value for the left-eye gray scale data and a post-correction gray scale value for the right-eye gray scale data are equal to each other for at least the first pixel group.

Effects of the Invention

According to the first aspect of the present invention, the predetermined number of pixels having the same gray scale value and adjacent to each other are divided into two pixel groups (a first pixel group and a second pixel group). Here, for at least the first pixel group, their gray scale values are corrected such that the luminance does not change at switching timing between left-eye image display and right-eye image display. Hence, crosstalk or flicker does not occur in a first pixel group region. In addition, gray scale value correction is performed such that an average gray scale value of each group including the predetermined number of pixels is not changed between before and after the correction. Hence, in a second pixel group region, the luminance greatly changes at switching timing between left-eye image display and right-eye image display. By this, the liquid crystal response time is reduced, and accordingly, the occurrence of crosstalk is also suppressed in the second pixel group region. By the above, in a liquid crystal display device that performs 3D display based on write gray scale data generated by this display control circuit, a reduction in image quality caused by crosstalk is suppressed. In addition, since there is no need to include a special IC as a display control circuit, and there is no need to change materials, a reduction in image quality caused by crosstalk can be suppressed at low cost.

According to the second aspect of the present invention, post-correction gray scale values can be relatively easily determined.

According to the third aspect of the present invention, the gray scale values for only one of left-eye gray scale data and right-eye gray scale data should be changed upon switching between left-eye image display and right-eye image display. Hence, the load of the process of correcting the gray scale values is reduced.

According to the fourth aspect of the present invention, data on pre- and post-correction gray scale values can be previously registered in a gray scale correction look-up table such that the liquid crystal response speed in the second pixel group gets higher. Hence, a reduction in image quality caused by crosstalk can be more effectively suppressed.

According to the fifth aspect of the present invention, in a liquid crystal display device capable of performing 3D image display, a reduction in image quality caused by crosstalk is suppressed.

According to the sixth aspect of the present invention, the same effects as those obtained in the first aspect of the present invention can be obtained in an invention of a display control method.

BRIEF DESCRIPTION OF THE DRAWINGS

FIG. 4 is a diagram schematically showing an example of an overshoot look-up table in the embodiment.

FIG. 9 is a diagram showing an example of liquid crystal response time.

FIG. 13 is a diagram for describing a gray scale value correction method in a first variant of the embodiment.

FIG. 14 is a block diagram showing a configuration of a display control circuit in a second variant of the embodiment.

FIG. 15 is a diagram schematically showing a configuration of a gray scale correction look-up table in the second variant of the embodiment.

MODE FOR CARRYING OUT THE INVENTION

An embodiment of the present invention will be described below with reference to the accompanying drawings.

<1. Overall Configuration and Summary of Operation>

Figure 1:
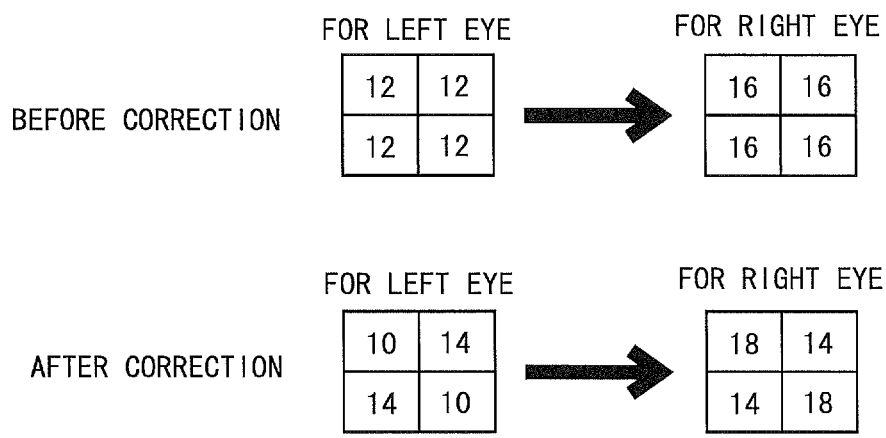
FIG. 1 is a diagram for describing a gray scale value correction method for a liquid crystal display device according to an embodiment of the present invention.
Figure 2:
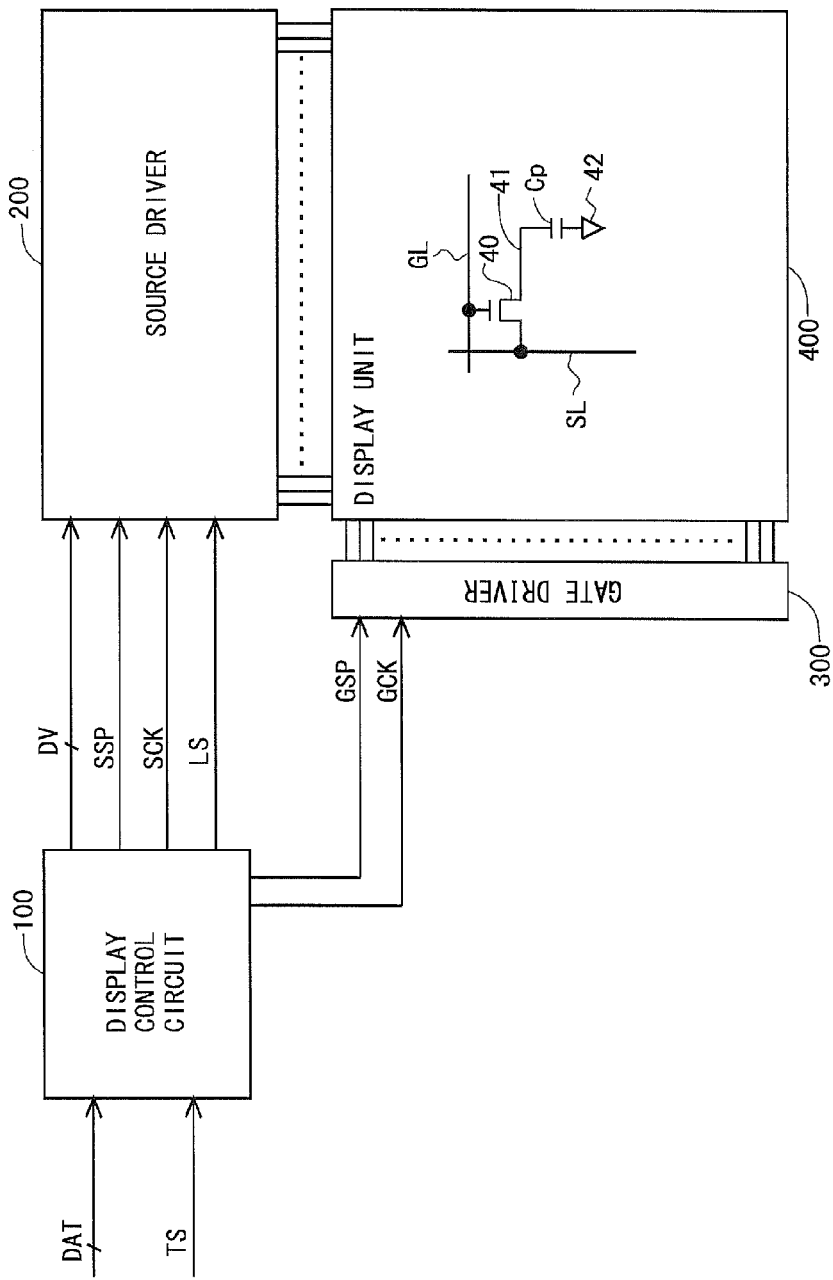
FIG. 2 is a block diagram showing an overall configuration of the liquid crystal display device in the embodiment.

FIG. 2 is a block diagram showing an overall configuration of a liquid crystal display device according to an embodiment of the present invention. The liquid crystal display device is composed of a display control circuit 100, a source driver (video signal line drive circuit) 200, a gate driver (scanning signal line drive circuit) 300, and a display unit 400. A plurality of source bus lines (video signal lines) SL and a plurality of gate bus lines (scanning signal lines) GL are arranged in the display unit 400. A pixel formation portion forming a pixel is provided at each of the intersections of the source bus lines SL and the gate bus lines GL. That is, a plurality of pixel formation portions are included in the display unit 400. The plurality of pixel formation portions are arranged in a matrix, forming a pixel array. Each pixel formation portion includes a thin film transistor (TFT) 40 which is a switching element connected at its gate terminal to a gate bus line GL passing through a corresponding intersection, and connected at its source terminal to a source bus line SL passing through the intersection; a pixel electrode 41 connected to the drain terminal of the thin film transistor 40; a common electrode 42 which is a counter electrode for providing a common potential to the plurality of pixel formation portions; and a liquid crystal layer provided so as to be shared by the plurality of pixel formation portions, and sandwiched between the pixel electrode 41 and the common electrode 42. By a liquid crystal capacitance formed by the pixel electrode 41 and the common electrode 42, a pixel capacitance Cp is formed. In general, an auxiliary capacitance is provided in parallel with the liquid crystal capacitance so as to securely hold a voltage in the pixel capacitance Cp; however, the auxiliary capacitance is not directly related to the present invention and thus the description and depiction thereof are omitted. Note that in the display unit 400 in FIG. 2, only those components for one pixel formation portion are shown.

Meanwhile, the liquid crystal display device is configured to allow 3D display (stereoscopic vision). As a method for achieving 3D display, a frame-sequential method that alternately displays a left-eye image and a right-eye image is adopted.

Next, the operation of the components shown in FIG. 2 will be described. The display control circuit 100 receives from an external source an image signal DAT including left-eye gray scale data and right-eye gray scale data, and timing signals TS such as a horizontal synchronizing signal and a vertical synchronizing signal, and outputs digital video signals DV, a source start pulse signal SSP, a source clock signal SCK, and a latch strobe signal LS for controlling the operation of the source driver 200, and a gate start pulse signal GSP and a gate clock signal GCK for controlling the operation of the gate driver 300.

The source driver 200 receives the digital video signals DV, the source start pulse signal SSP, the source clock signal SCK, and the latch strobe signal LS which are outputted from the display control circuit 100, and applies drive video signals to the respective source bus lines SL. At this time, in the source driver 200, the digital video signals DV indicating voltages to be applied to the respective source bus lines SL are sequentially held at timing at which a pulse of the source clock signal SCK occurs. Then, the held digital video signals DV are converted to analog voltages at timing at which a pulse of the latch strobe signal LS occurs. The converted analog voltages are simultaneously applied to all of the source bus lines SL, as drive video signals. The gate driver 300 repeats application of active scanning signals to the respective gate bus lines GL based on the gate start pulse signal GSP and the gate clock signal GCK which are outputted from the display control circuit 100, in cycles of one vertical scanning period.

In the above-described manner, the drive video signals are applied to the respective source bus lines SL, and the scanning signals are applied to the respective gate bus lines GL, by which a 3D image (stereo image) based on the image signal DAT transmitted from the external source is displayed on the display unit 400.

<2. Display Control Circuit>

Figure 3:
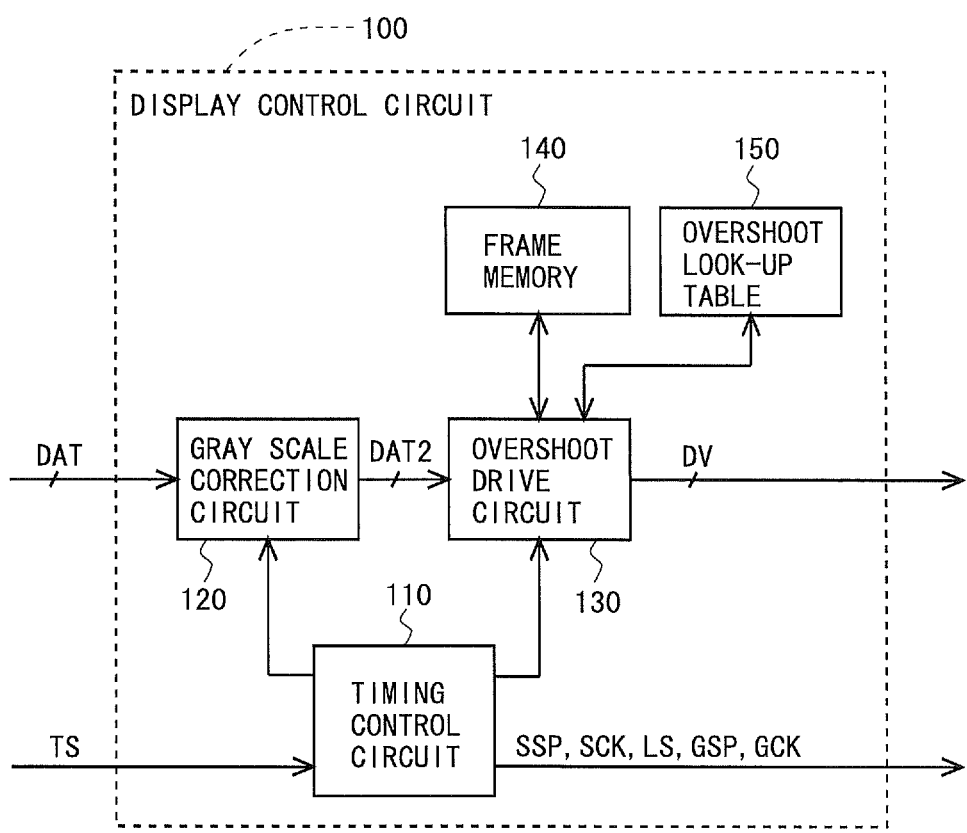
FIG. 3 is a block diagram showing a configuration of a display control circuit in the embodiment.

FIG. 3 is a block diagram showing a configuration of the display control circuit 100 in the present embodiment. The display control circuit 100 includes a timing control circuit 110, a gray scale correction circuit 120, an overshoot drive circuit 130, a frame memory 140, and an overshoot look-up table 150.

The timing control circuit 110 controls the operation of the gray scale correction circuit 120 and the overshoot drive circuit 130 and outputs a source start pulse signal SSP, a source clock signal SCK, a latch strobe signal LS, a gate start pulse signal GSP, and a gate clock signal GCK, based on timing signals TS transmitted from an external source.

The gray scale correction circuit 120 performs correction on an image signal DAT to suppress occurrence of crosstalk occurring in displaying an image on the display unit 400. In this correction, values (gray scale values) indicated by left-eye gray scale data and right-eye gray scale data which are included in the image signal DAT are corrected. Note that a specific gray scale value correction method will be described later.

The overshoot drive circuit 130 performs correction on an image signal DAT2 having been subjected to the correction by the gray scale correction circuit 120, to emphasize a temporal change of the signal (hereinafter, a method for driving liquid crystal after performing this correction is referred to as "overshoot drive"), generates write gray scale data indicating application gray scale values for the respective pixel formation portions, and outputs the write gray scale data as digital video signals DV.

Now, the overshoot drive will be described in detail. The overshoot drive is a drive method aimed at suppressing a reduction in image quality upon moving image display, which is caused by a low liquid crystal response speed. In the overshoot drive, according to a combination of an input image signal for a previous frame and an input image signal for a current frame, a higher drive voltage than a gray scale voltage corresponding to the input image signal for the current frame or a lower drive voltage than the gray scale voltage corresponding to the input image signal for the current frame is supplied to the display unit. By adopting such overshoot drive, the time required to reach the gray scale voltage corresponding to the input image signal for the current frame is reduced, suppressing a reduction in image quality upon moving image display.

A liquid crystal display device adopting overshoot drive holds a look-up table (overshoot look-up table 150) so as to determine a drive voltage based on a combination of a gray scale value corresponding to an input image signal for a previous frame (hereinafter, referred to as a "previous-frame gray scale value") and a gray scale value corresponding to an input image signal for a current frame (hereinafter, referred to as a "current-frame gray scale value"). FIG. 4 is a diagram schematically showing an example of the overshoot look-up table 150 held in a liquid crystal display device capable of performing 256 gray scale display. In FIG. 4, the numerical values described in the leftmost column indicate previous-frame gray scale values, and the numerical values described in the topmost row indicate current-frame gray scale values. A numerical value described at a location where a row and a column intersect indicates a gray scale value (hereinafter, referred to as an "application gray scale value") corresponding to a drive voltage which is determined based on a combination of a previous-frame gray scale value and a current-frame gray scale value. For example, when the previous-frame gray scale value is "64" and the current-frame gray scale value is "128", the application gray scale value is "155". In addition, for example, when the previous-frame gray scale value is "160" and the current-frame gray scale value is "64", the application gray scale value is "20". As such, based on the data stored in the overshoot look-up table 150, a higher drive voltage than a gray scale voltage corresponding to an input image signal for a current frame or a lower drive voltage than the gray scale voltage corresponding to the input image signal for the current frame is applied to the liquid crystal.

As described above, when overshoot drive is performed, based on a combination of a previous-frame gray scale value and a current-frame gray scale value, an application gray scale value is determined according to the overshoot look-up table 150. Hence, previous-frame gray scale values for one frame need to be held. Thus, a liquid crystal display device adopting overshoot drive is provided with the frame memory 140 for holding previous-frame gray scale values for one frame.

<3. Gray Scale Value Correction Method>

Figures 5, 6, 7, 8:
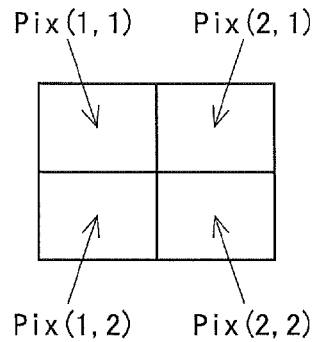
FIG. 5 is a diagram for describing a focused pixel group in the embodiment.
FIG. 6 is a diagram showing the pre-correction gray scale values of the focused pixel group in the embodiment.
FIG. 7 is a diagram showing the post-correction gray scale values of the focused pixel group in the embodiment.
FIG. 8 is a diagram for describing an edge portion of an image in the embodiment.

Next, a gray scale value correction method in the present embodiment will be described. In the present embodiment, gray scale value correction is performed such that four pixels (pixels of two rows×two columns) having the same gray scale value are considered one collective group. In addition, when four pixels forming each group are focused (hereinafter, the four pixels are referred to as a "focused pixel group"), correction is performed on the gray scale values of the respective pixels in the focused pixel group such that brightness corresponding to the original gray scale value is visually recognized in a pseudo manner at the entire focused pixel group. A specific example will be described below. Note that for a focused pixel group, in the present description, as shown in FIG. 5, a pixel arranged in the upper left position is referred to as Pix (1, 1), a pixel arranged in the lower left position is referred to as Pix (1, 2), a pixel arranged in the upper right position is referred to as Pix (2, 1), and a pixel arranged in the lower right position is referred to as Pix (2, 2).

First, four pixels forming a focused pixel group are divided into pixels (hereinafter, referred to as a "first pixel group") whose post-correction gray scale values are the same between a left-eye image and a right-eye image, and pixels (hereinafter, referred to as a "second pixel group") whose post-correction gray scale values are different between the left-eye image and the right-eye image. In the present embodiment, Pix (1, 2) and Pix (2, 1) serve as the first pixel group, and Pix (1, 1) and Pix (2, 2) serve as the second pixel group. Here, it is assumed that, as shown in FIG. 6, the pre-correction gray scale value of the focused pixel group is "12" for the left-eye image, and is "16" for the right-eye image. At this time, an average value between a pre-correction gray scale value of the left-eye image and a pre-correction gray scale value of the right-eye image is a post-correction gray scale value of the first pixel group. Therefore, in this example, the post-correction gray scale values of Pix (1, 2) and Pix (2, 1) which serve as the first pixel group are "14" which is an average value between "12" and "16". The post-correction gray scale values of the second pixel group are determined such that, for both of the left-eye image and the right-eye image, an average gray scale value of the entire focused pixel group is not changed between before and after the correction. Therefore, in this example, the post-correction gray scale values of Pix (1, 1) and Pix (2, 2) which serve as the second pixel group are "10" for the left-eye image and are "18" for the right-eye image. In the above-described manner, in this example, the post-correction gray scale values of the focused pixel group are such as those shown in FIG. 7. In this manner, as for the left-eye image, the gray scale values of Pix (1, 2) and Pix (2, 1) are corrected from "12" to "14", and the gray scale values of Pix (1, 1) and Pix (2, 2) are corrected from "12" to "10". In addition, for the right-eye image, the gray scale values of Pix (1, 2) and Pix (2, 1) are corrected from "16" to "14", and the gray scale values of Pix (1, 1) and Pix (2, 2) are corrected from "16" to "18".

Meanwhile, the above-described correction can be generalized as follows. Note that it is assumed that the pre-correction gray scale value of the focused pixel group is GL for the left-eye image and is GR for the right-eye image. First, a post-correction gray scale value GM of the first pixel group for both of the left-eye image and the right-eye image is obtained by the following equation (1).

$$GM = (GL + GR)/2 \quad (1)$$

Then, a post-correction gray scale value GLa of the second pixel group for the left-eye image is obtained by the following equation (2), and a post-correction gray scale value GRa of the second pixel group for the right-eye image is obtained by the following equation (3).

$$GLa = 2GL - GM \quad (2)$$

$$GRa = 2GR - GM \quad (3)$$

Note that it is also considered to perform division of the focused pixel group such that, for example, Pix (1, 1) and Pix (2, 1) serve as a first pixel group, and Pix (1, 2) and Pix (2, 2) serve as a second pixel group. However, in terms of allowing brightness corresponding to the original gray scale value to be visually recognized in a pseudo manner at the entire focused pixel group, it is preferred to perform division in the manner shown in the present embodiment.

Note also that, when all pixels in the display unit 400 are grouped by four pixels of two rows×two columns, the pre-correction gray scale values of four pixels included in each group are not always identical. For example, at an edge portion of an image, as shown in FIG. 8, a plurality of pixels having different gray scale values are present in a group. Gray scale value correction according to the present invention is not performed on such a portion.

<4. Effects>

According to the present embodiment, when four pixels (pixels of two rows×two columns) having the same gray scale value are focused, the four pixels are divided into two pixels (first pixel group) whose post-correction gray scale values are the same between a left-eye image and a right-eye image, and two pixels (second pixel group) whose post-correction gray scale values are different between the left-eye image and the right-eye image. In a first pixel group region, since the luminance does not change at switching timing between left-eye image display and right-eye image display, crosstalk or flicker does not occur. In addition, the gray scale values of the respective pixels are corrected such that an average gray scale value of all of the four pixels is not changed between before and after the correction. Thus, in a second pixel group region, compared to before the correction, the luminance greatly changes at switching timing between left-eye image display and right-eye image display. When the luminance thus greatly changes, the liquid crystal response time is reduced compared to before the correction. This will be described with reference to FIG. 9. FIG. 9 is a diagram showing an example of liquid crystal response time. In FIG. 9, the numerical values described in the leftmost column indicate previous-frame gray scale values, and the numerical values described in the topmost row indicate current-frame gray scale values. A numerical value described at a location where a row and a column intersect indicates response time for when the gray scale value changes from a previous-frame gray scale value to a current-frame gray scale value. For example, in the case where the previous-frame gray scale value is "64", the response time is 6.4 milliseconds when the current-frame gray scale value is "96", and the response time is 4.1 milliseconds when the current-frame gray scale value is "128". From this fact, it is grasped that the greater the difference between the previous-frame gray scale value and the current-frame gray scale value is, the shorter the response time is (the higher the response speed is). In this regard, according to the present embodiment, in the second pixel group region, since the luminance greatly changes at switching timing between left-eye image display and right-eye image display compared to conventional cases, i.e., since the difference between the previous-frame gray scale value and the current-frame gray scale value is great compared to conventional cases, the liquid crystal response time is reduced compared to before the correction. By this, in the second pixel group region, too, the occurrence of crosstalk is suppressed. In the above-described manner, in a liquid crystal display device capable of performing 3D display, a reduction in image quality caused by crosstalk is suppressed. In addition, according to the present embodiment, there is no need to include a special IC as a display control circuit, and there is no need to change materials from those of conventional liquid crystal display devices. Thus, a liquid crystal display device capable of suppressing a reduction in image quality caused by crosstalk is implemented at low cost.

Figure 10:
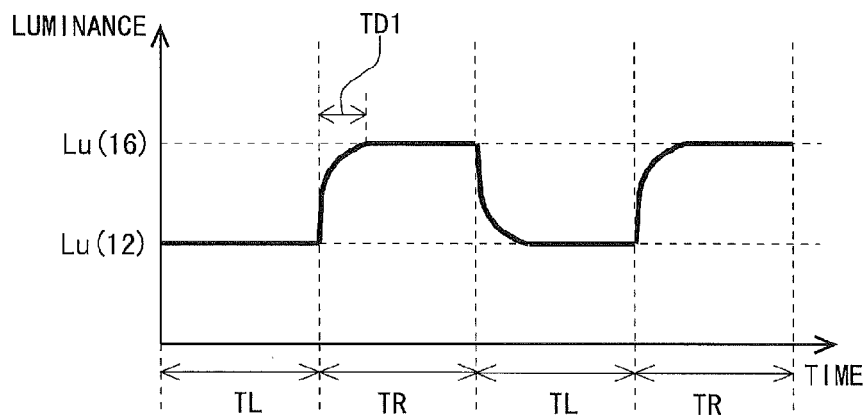
FIG. 10 is a diagram showing a change in the luminance in a focused pixel group in a conventional example.
Figure 11:
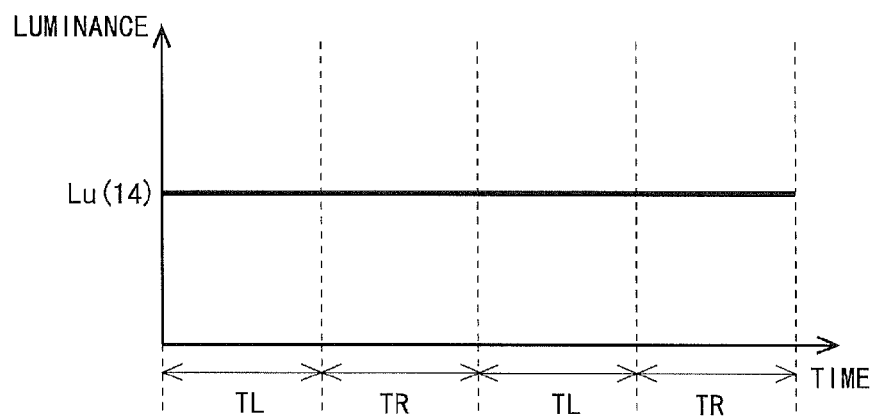
FIG. 11 is a diagram showing a change in the luminance in a first pixel group region in the embodiment.
Figure 12:
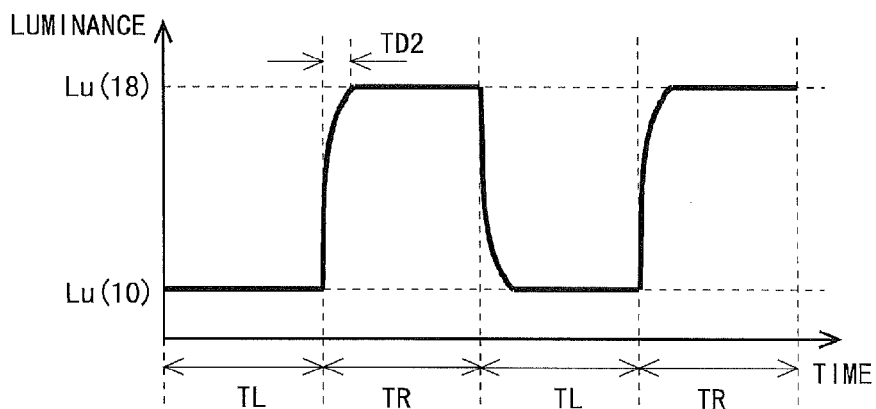
FIG. 12 is a diagram showing a change in the luminance in a second pixel group region in the embodiment.

Effects obtained in the present embodiment will be further described with reference to FIGS. 1 and 10 to 12. Note that in FIGS. 10 to 12, luminance corresponding to a gray scale value n is represented by Lu(n). In the above-described specific example, the pre-correction gray scale value of the focused pixel group is "12" for the left-eye image and is "16" for the right-eye image. If image display is performed based on these pre-correction gray scale values, then the gray scale values uniformly change in all pixels in the focused pixel group (see "before correction" in FIG. 1) upon switching from a left-eye image display period to a right-eye image display period. That is, according to the conventional example, for all pixels in the focused pixel group, the luminance changes as shown in FIG. 10. On the other hand, if image display is performed based on post-correction gray scale values, then the gray scale values are maintained for some pixels (first pixel group) and the gray scale values greatly change for the remaining pixels (second pixel group) compared to before the correction (see "after correction" in FIG. 1) upon switching from a left-eye image display period to a right-eye image display period. That is, according to the present embodiment, the luminance is constant as shown in FIG. 11 in the first pixel group region, and the luminance changes as shown in FIG. 12 in the second pixel group region. Here, it is grasped from FIGS. 10 and 12 that according to the present embodiment the change in luminance is great compared to the conventional example. Hence, response time TD2 in the present embodiment is smaller than response time TD1 in the conventional example. As described above, according to the present embodiment, upon switching between left-eye image display and right-eye image display, the luminance does not change in the first pixel group region, and the luminance greatly changes in the second pixel group region compared to conventional cases. As a result, a reduction in image quality caused by crosstalk is suppressed.

<5. Variants>

<5.1 First Variant>

FIG. 13 is a diagram for describing a gray scale value correction method in a first variant of the above-described embodiment. As shown in FIG. 13, in the present variant, gray scale value correction is not performed on a left-eye image. As for a right-eye image, the post-correction gray scale value of a first pixel group is the gray-scale value of the left-eye image, and the post-correction gray scale value of a second pixel group is determined such that an average gray scale value of the entire focused pixel group is not changed between before and after the correction.

In the present variant, too, upon switching between left-eye image display and right-eye image display, the luminance does not change in a first pixel group region, and the luminance greatly changes in a second pixel group region compared to conventional cases (see FIG. 13). Therefore, a reduction in image quality caused by crosstalk is suppressed. In addition, the gray scale values for only one of the left-eye image and the right-eye image should be changed upon switching between left-eye image display and right-eye image display. Hence, the load of the process of correcting the gray scale values is reduced.

<5.2 Second Variant>

FIG. 14 is a block diagram showing a configuration of a display control circuit 101 in a second variant of the above-described embodiment. In the present variant, in addition to the components of the above-described embodiment shown in FIG. 3, a gray scale correction look-up table 160 is provided in the display control circuit 101. FIG. 15 is a diagram schematically showing a configuration of the gray scale correction look-up table 160. In FIG. 15, the numerical values described in the leftmost column indicate the pre-correction gray scale values (first input values) of the focused pixel group for the left-eye image, and the numerical values described in the topmost row indicate the pre-correction gray scale values (second input values) of the focused pixel group for the right-eye image. A numerical value described at a location where a row and a column intersect indicates a post-correction gray scale value (output value) of the first pixel group.

Figure 16:
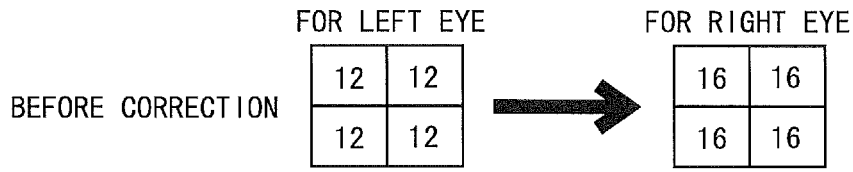
FIG. 16 is a diagram for describing a gray scale value correction method in the second variant of the embodiment.

In the present variant, gray scale value correction is performed as follows. First, as in the above-described embodiment, a first pixel group and a second pixel group are determined. Then, with a pre-correction gray scale value of a left-eye image being a first input value and a pre-correction gray scale value of a right-eye image being a second input value, a post-correction gray scale value of the first pixel group is determined from the gray scale correction look-up table 160. As in the above-described embodiment, the post-correction gray scale values of the second pixel group are determined such that, for both of the left-eye image and the right-eye image, an average gray scale value of the entire focused pixel group is not changed between before and after the correction. For example, when the output value corresponding to a combination of "first input value=12" and "second input value=16" is "13" in the gray scale correction look-up table 160, first, the post-correction gray scale value of the first pixel group is determined to be "13". Thereafter, the post-correction gray scale value of the second pixel group is determined to be "11" for the left-eye image and is determined to be "19" for the right-eye image. In the above-described manner, in the present variant, too, upon switching between left-eye image display and right-eye image display, the luminance does not change in a first pixel group region, and the luminance greatly changes in a second pixel group region compared to conventional cases (see FIG. 16).

Meanwhile, there are multiple combinations of a post-correction gray scale value of the left-eye image for the second pixel group and a post-correction gray scale value of the right-eye image for the second pixel group, and the liquid crystal response time (response speed) varies depending on the combination. Therefore, when determining the post-correction gray scale values of the second pixel group, it is preferred to select a combination with the shortest possible response time. In this regard, according to the present variant, the post-correction gray scale values of the first pixel group can be previously set in the look-up table such that the liquid crystal response speed of the second pixel group gets higher. Hence, in a liquid crystal display device capable of performing 3D display, a reduction in image quality caused by crosstalk can be more effectively suppressed.

<5.3 Third Variant>

Figure 17:
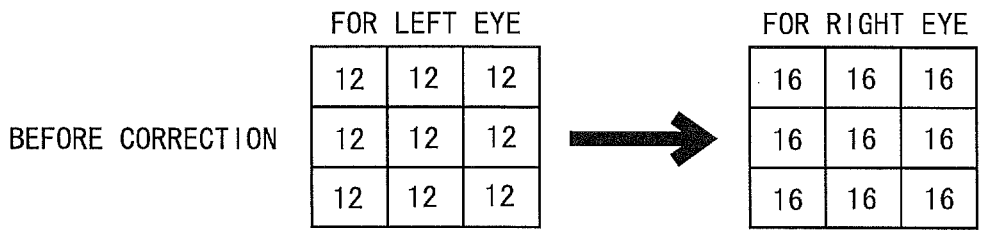
FIG. 17 is a diagram for describing a gray scale value correction method in a third variant of the embodiment.
Figure 18:
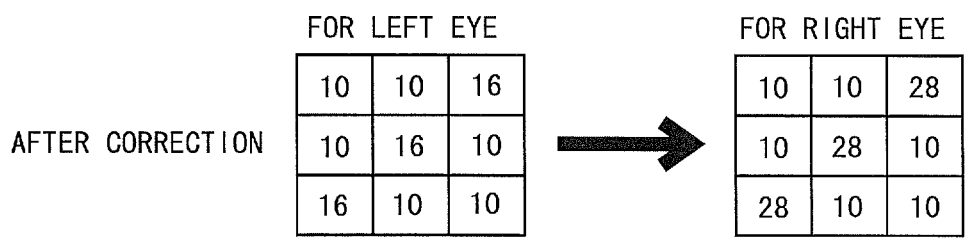
FIG. 18 is a diagram showing an example in which the numbers of rows and columns of pixels forming a focused pixel group are different from each other in the third variant of the embodiment.
Figure 19:
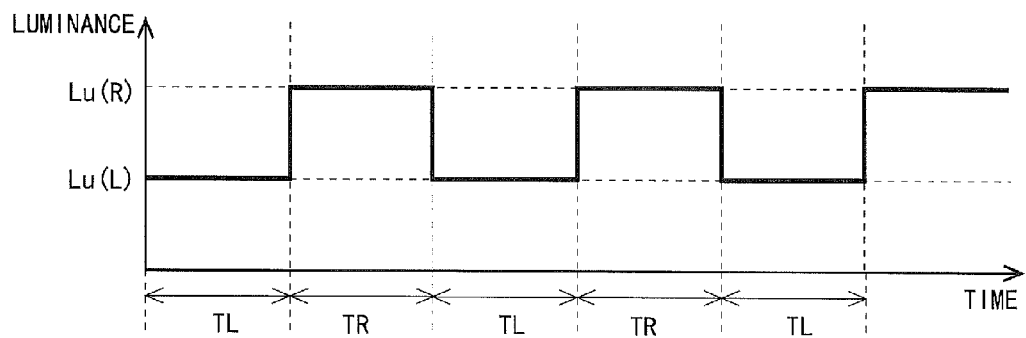
FIG. 19 is a diagram showing an ideal change in luminance for when 3D display is performed in a conventional example.
Figure 20:
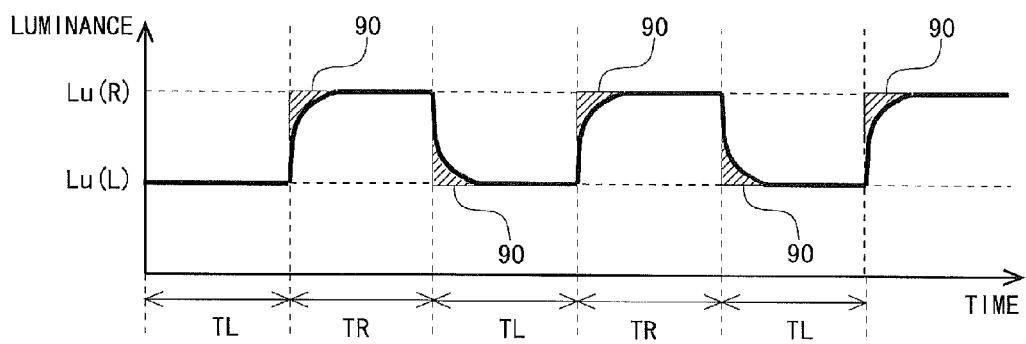
FIG. 20 is a diagram showing an actual change in luminance for when 3D display is performed in the conventional example.

Although in the embodiment, the first variant, and the second variant, a focused pixel group is composed of four pixels, and two of the four pixels serve as a first pixel group and the remaining two pixels serve as a second pixel group, the present invention is not limited thereto. For example, as shown in FIG. 17, a focused pixel group may be composed of nine pixels. Alternatively, as long as correction can be performed such that brightness corresponding to the original gray scale value is visually recognized in a pseudo manner at the entire focused pixel group, for example, as shown in FIG. 17, two-thirds of the pixels in a focused pixel group may serve as a first pixel group, and one-thirds of the pixels in the focused pixel group may serve as a second pixel group. As such, the number of pixels forming a focused pixel group or the component ratio between a first pixel group and a second pixel group in a focused pixel group is not particularly limited. In addition, for example, as shown in FIG. 18, the numbers of rows and columns of pixels forming a focused pixel group may be different from each other.

DESCRIPTION OF REFERENCE CHARACTERS 100 and 101: DISPLAY CONTROL CIRCUIT
110: TIMING CONTROL CIRCUIT
120: GRAY SCALE CORRECTION CIRCUIT
130: OVERSHOOT DRIVE CIRCUIT
140: FRAME MEMORY
150: OVERSHOOT LOOK-UP TABLE
160: GRAY SCALE CORRECTION LOOK-UP TABLE
200: SOURCE DRIVER (VIDEO SIGNAL LINE DRIVE CIRCUIT)
300: GATE DRIVER (SCANNING SIGNAL LINE DRIVE CIRCUIT)
400: DISPLAY UNIT

The invention claimed is:

1. A display control circuit that generates write gray scale data to be provided to a display device, based on an image signal including left-eye gray scale data and right-eye gray scale data, the display device displaying a 3D image by alternately displaying a left-eye image and a right-eye image, the display control circuit comprising:
    a gray scale correction circuit that corrects the image signal such that an average gray scale value of each of groups is not changed between before and after the correction, each group including a predetermined number of pixels adjacent to each other, and the pixels having a same gray scale value indicated by the left-eye gray scale data and having a same gray scale value indicated by the right-eye gray scale data; and
    an overshoot drive circuit that generates the write gray scale data by performing correction on the image signal corrected by the gray scale correction circuit, to emphasize a temporal change of the signal, wherein
    the gray scale correction circuit divides the predetermined number of pixels included in each group into a first pixel group and a second pixel group, and corrects the image signal such that a post-correction gray scale value for the left-eye gray scale data and a post-correction gray scale value for the right-eye gray scale data are equal to each other for at least the first pixel group.

2. The display control circuit according to claim 1, wherein a post-correction gray scale value GM for the left-eye gray scale data and the right-eye gray scale data for the first pixel group is calculated by a following equation:

$$GM=(GL+GR)/2$$

where GL represents a pre-correction gray scale value for the left-eye gray scale data, and GR represents a pre-correction gray scale value for the right-eye gray scale data.

3. The display control circuit according to claim 1, wherein the gray scale correction circuit corrects, for the second pixel group, the image signal such that a gray scale value for the left-eye gray scale data or a gray scale value for the right-eye gray scale data is not changed between before and after the correction.

4. The display control circuit according to claim 1, further comprising a gray scale correction look-up table that stores a first input value, a second input value, and an output value corresponding to a combination of the first input value and the second input value, wherein
    with a pre-correction gray scale value for the left-eye gray scale data being the first input value and a pre-correction gray scale value for the right-eye gray scale data being the second input value, the gray scale correction circuit extracts an output value from the gray scale correction look-up table, and uses the extracted output value as a post-correction gray scale value for the left-eye gray scale data and the right-eye gray scale data for the first pixel group.

5. A liquid crystal display device comprising:

the display control circuit according to claim 1;

a display unit including: a plurality of video signal lines for transmitting a plurality of video signals corresponding to the write gray scale data; a plurality of scanning signal lines intersecting the plurality of video signal lines; a plurality of pixel formation portions arranged in a matrix along the plurality of video signal lines and the plurality of scanning signal lines; and a common electrode that provides a common potential to the plurality of pixel formation portions;

a video signal line drive circuit that drives the plurality of video signal lines; and a scanning signal line drive circuit that drives the plurality of scanning signal lines.

6. A display control method for generating write gray scale data to be provided to a display device, based on an image signal including left-eye gray scale data and right-eye gray scale data, the display device displaying a 3D image by alternately displaying a left-eye image and a right-eye image, the method comprising:

a gray scale correction step of correcting the image signal such that an average gray scale value of each of groups is not changed between before and after the correction, each group including a predetermined number of pixels adjacent to each other, and the pixels having a same gray scale value indicated by the left-eye gray scale data and having a same gray scale value indicated by the right-eye gray scale data; and an overshoot drive step of generating the write gray scale data by performing correction on the image signal corrected in the gray scale correction step, to emphasize a temporal change of the signal, wherein in the gray scale correction step, the predetermined number of pixels included in each group are divided into a first pixel group and a second pixel group, and the image signal is corrected such that a post-correction gray scale value for the left-eye gray scale data and a post-correction gray scale value for the right-eye gray scale data are equal to each other for at least the first pixel group.

* * * * *

UNITED STATES PATENT AND TRADEMARK OFFICE
CERTIFICATE OF CORRECTION

PATENT NO. : 9,344,709 B2  
APPLICATION NO. : 14/350419  
DATED : May 17, 2016  
INVENTOR(S) : Ryo Yamakawa Page 1 of 1

It is certified that error appears in the above-identified patent and that said Letters Patent is hereby corrected as shown below:

The following should be corrected for item (87) on the title page of the Patent:

PCT Pub. No.: WO2013/058158

PCT Pub. Date: Apr. 25, 2013

Signed and Sealed this  
Second Day of August, 2016

Michelle K. Lee  
*Director of the United States Patent and Trademark Office*